(12) United States Patent
Tokuyama

(10) Patent No.: US 6,218,811 B1
(45) Date of Patent: Apr. 17, 2001

(54) OUTPUT VARIABLE CHARGING CIRCUIT AND CHARGER INCORPORATING SAME

(75) Inventor: Hiroshi Tokuyama, Kyoto (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/569,938

(22) Filed: May 12, 2000

(30) Foreign Application Priority Data

May 20, 1999 (JP) .................................................. 11-140179

(51) Int. Cl.⁷ .............................................. H01M 10/46
(52) U.S. Cl. ........................................... 320/137; 320/163
(58) Field of Search ................................. 320/124, 125, 320/128, 134, 136, 137, 160, 162, 163, 164

(56) References Cited

U.S. PATENT DOCUMENTS 5,204,611 * 4/1993 Nor et al. .
5,396,163 * 3/1995 Nor et al. .

* cited by examiner

Primary Examiner—Edward H. Tso
(74) Attorney, Agent, or Firm—Ostrolenk, Faber, Gerb & Soffen, LLP

(57) ABSTRACT

An output variable charging circuit has a charging control circuit for controlling charging characteristics so as to satisfy a predetermined charging condition; and a charging characteristic detection circuit connected to the charging control circuit, the charging characteristic detection circuit detecting the charging characteristics to obtain a charging characteristic detection value and changing the charging characteristic detection value according to an input external signal so as to feedback to the charging control circuit.

14 Claims, 3 Drawing Sheets

OUTPUT VARIABLE CHARGING CIRCUIT AND CHARGER INCORPORATING SAME

CROSS REFERENCE TO RELATED APPLICATION

This application is one of four related applications, attorney docket numbers: 1071-1011, 1071-1012, 1071-1013 and 1071-1016.

BACKGROUND OF THE INVENTION

1. Field of the Invention

The present invention relates to output variable charging circuits and chargers using the same, and more specifically, the invention relates to output variable charging circuits incorporated in portable devices using secondary batteries as power supplies, and chargers using the same.

2. Description of the Related Art

FIG. 3 shows a circuit diagram of a conventional output variable charging circuit and a charger using the same.

In FIG. 3, an output variable charging circuit 1 has a charging control circuit 2, electrolytic capacitors 3 and 4, a current detection resistor 5, a charging current detection circuit 6, a charging voltage detection circuit 7, a selector switch 8, and a charging condition memory circuit 9. The input of the charging control circuit 2 is connected to an external DC power supply 11. In addition, the output of the charging control circuit 2 is connected to an external secondary battery 12. Between the positive poles and negative poles of the input and the output of the charging control circuit 2 are connected an electrolytic capacitor 3 and an electrolytic capacitor 4, respectively. Between the positive pole of the output of the charging control circuit 2 and the secondary battery 12, the current detection resistor 5 is connected in series. In addition, both ends of the current detection resistor 5 are connected to the charging current detection circuit 6, and a side of the current detection resistor 5, where the secondary battery 12 is disposed, is connected to the charging voltage detection circuit 7. The output of the charging current detection circuit 6 and the output of the charging voltage detection circuit 7 are connected to the charging control circuit 2. Furthermore, the selector switch 8 is connected to the charging control circuit 2 via the charging condition memory circuit 9. In this case, the charging current detection circuit 6 and the charging voltage detection circuit 7 together form a charging characteristic detection circuit 10.

Furthermore, a charger 13 is formed by the output variable charging circuit 1 and the DC power supply 11.

In the output variable charging circuit 1 and the charger 13 having such structures, the charging condition memory circuit 9 stores a plurality of charging conditions corresponding to various kinds of secondary batteries such as a lithium-ion battery, a nickel-hydrogen battery, and a nickel-cadmium battery, and circuits connected in series and parallel to the secondary battery. In this case, the charging conditions are referred to as determined values of a charging current and a charging voltage. One of the charging conditions is selected from the charging condition memory circuit 9 by using the selector switch 8 and is input to the charging control circuit 2.

Meanwhile, the charging current detection circuit 6 detects a charging current from voltages of both ends of the current detection resistor 5 and gives a feedback as a charging current detection value to the charging control circuit 2. The charging voltage detection circuit 7 detects a charging voltage and gives a feedback as a charging voltage detection value to the charging control circuit 2. Such an actual charging current and an actual charging voltage represent charging characteristics. In addition, the charging current detection value and the charging voltage detection value obtained by detecting the charging characteristics by the charging characteristic detection circuit 10 are referred to as charging characteristic values. The charging control circuit 2 controls outputs in such a manner that the charging current detection value and the charging voltage detection value fed back from the charging current detection circuit 6 and the charging voltage detection circuit 7 can satisfy a charging condition input in advance from the charging condition memory circuit 9.

In this way, the output variable charging circuit 1 can be used as a charging circuit which can be adapted to a plurality of secondary batteries or the combination thereof, whose charging conditions differ from each other, by using the selector switch.

Meanwhile, when the output variable charging circuit 1 is manufactured as a product to be used by a user, it is necessary to store in advance the kind of a secondary battery required for the user and charging conditions for circuits connected in series and parallel to the secondary battery in the charging condition memory circuit 9. In this case, depending on the kinds of the charging conditions, the memory capacity of the charging condition memory circuit 9 or the number of times of switching performed by using the selector switch 8 is increased. As a result, this causes a problem in that the size and price of the output variable charging circuit 1 increase. In addition, since the output variable charging circuit 1 cannot adapt to charging conditions different from those stored in advance, for example, a new type of secondary battery, or a new combination of conventional secondary batteries, in this case, it is necessary to produce another output variable charging circuit adaptable to those by changing the contents stored in the charging condition memory circuit 9 and the like.

SUMMARY OF THE INVENTION

Accordingly, it is an object of the present invention to provide an output variable charging circuit capable of continuously changing charging characteristics such as a charging current and a charging voltage by using an external signal, and to provide a charger incorporating the output variable charging circuit.

To this end, the present invention provides an output variable charging circuit including a charging control circuit for controlling charging characteristics so as to satisfy a predetermined charging condition, and a charging characteristic detection circuit connected to the charging control circuit, the charging characteristic detection circuit detecting charging characteristics to obtain a charging characteristic detection value and changing the charging characteristic detection value according to an input external signal so as to give feedback to the charging control circuit.

In addition, the present invention provides an output variable charging circuit including a charging control circuit for controlling charging characteristics in such a manner that a predetermined charging condition is changed by an input external signal and the changed charging condition is thereby satisfied, and a charging characteristic detection circuit connected to the charging control circuit to detect the charging characteristics so as to obtain a charging characteristic detection value and feedback the charging characteristic detection value to the charging control circuit.

Furthermore, the output variable charging circuit of the present invention includes a signal conversion circuit for converting the external signal.

In addition, the present invention provides a charger including the output variable charging circuit described above, a DC power supply for supplying a DC current to the output variable charging circuit, and an external signal source for inputting an external signal to the output variable charging circuit.

According to the present invention, the output variable charging circuit includes the charging control circuit for controlling charging characteristics so as to satisfy the predetermined charging conditions, and the charging characteristic detection circuit connected to the charging control circuit to detect the charging characteristics so as to obtain a charging characteristic detection value, and to change the charging characteristic detection value according to an input external signal so as to allow the changed value to be fed back to the charging control circuit. With this arrangement, the charging characteristics such as a charging current and a charging voltage can be continuously changed according to the external signal. This can lead to cost reduction of the output variable charging circuit and the charger incorporating the same.

In addition, when the output variable charging circuit of the present invention includes a charging control circuit for controlling charging characteristics in such a manner that a predetermined charging condition is changed according to an inputted external signal and the changed charging condition is satisfied, and a charging characteristic detection circuit connected to the charging control circuit to detect the charging characteristics so as to obtain a charging characteristic detection value and feedback the charging characteristic detection value to the charging control circuit. With this arrangement, similarly, the charging characteristics such as a charging current and a charging voltage can be continuously changed according to the external signal. This can lead to cost reduction of the output variable charging circuit and the charger incorporating the same.

Furthermore, since the output variable charging circuit includes a signal conversion circuit for converting the external signal, the variation of the external signal source can be broadened, with the result that cost reduction of the charger incorporating the output variable charging circuit can be achieved.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
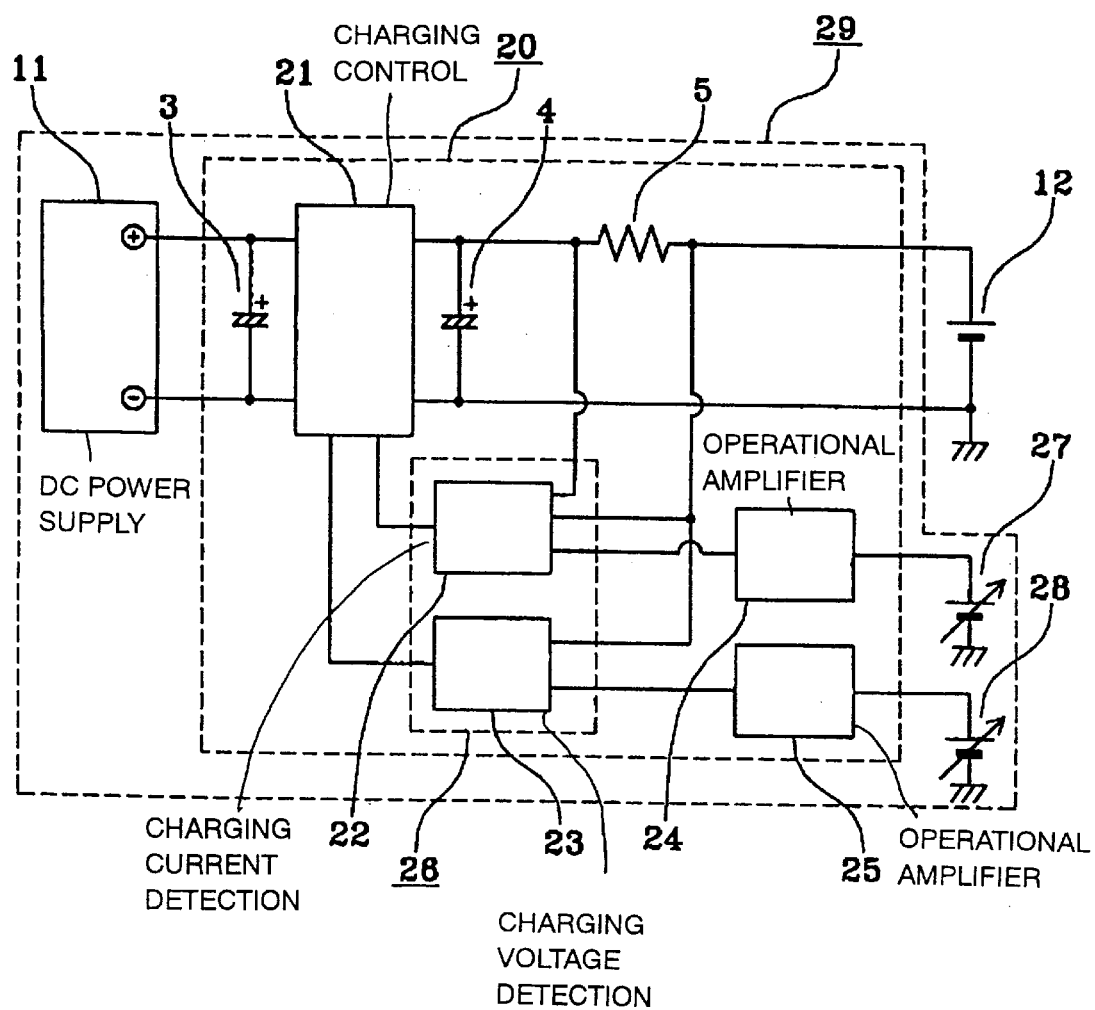
FIG. 1 is a circuit diagram of an output variable charging circuit according to an embodiment of the present invention.
Figure 3:
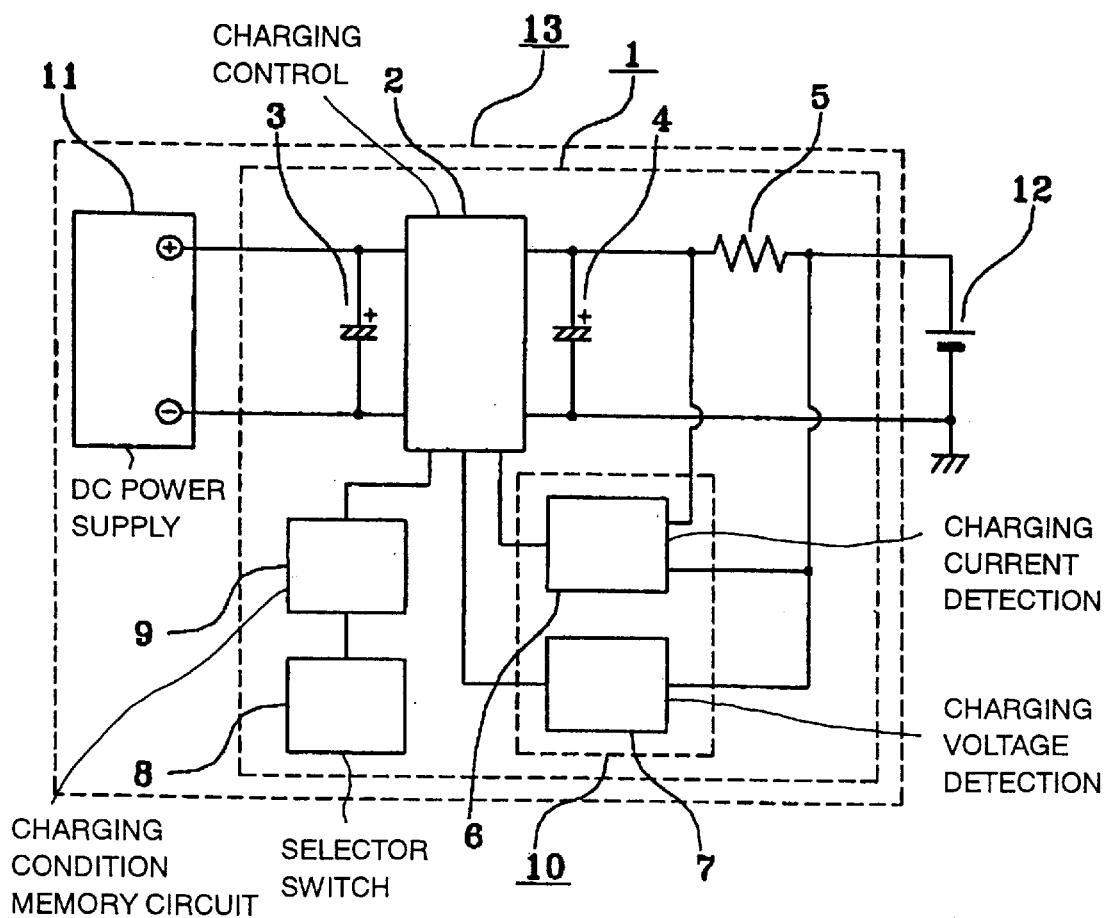
FIG. 3 is a circuit diagram of a conventional output variable charging circuit.

FIG. 1 shows an output variable charging circuit and a charger incorporating the same in accordance with an embodiment of the present invention. In FIG. 1, the same reference numerals are given to the same parts as those shown in FIG. 3 and the equivalent parts to those shown in FIG. 3. The explanation of the same and equivalent parts shown in FIG. 1 is omitted.

As shown in FIG. 1, in an output variable charging circuit 20, both ends of a current detection resistor 5 are connected to a charging current detection circuit 22, and a side of the current detection resistor 5, where a secondary battery 12 is disposed, is connected to a charging voltage detection circuit 23. In addition, the output variable charging circuit 20 includes operational amplification circuits 24 and 25 as signal conversion circuits. An external signal source 27 disposed externally is connected to the charging current detection circuit 22 via the operational amplification circuit 24, and another external signal source 28 similarly disposed externally is connected to the charging voltage detection circuit 23 via the operational amplification circuit 25. In addition, the outputs of the charging current detection circuit 22 and the charging voltage detection circuit 23 are connected to a charging control circuit 21. In this case, a charging characteristic detection circuit 26 is formed by both the charging current detection circuit 22 and the charging voltage detection circuit 23. The charging control circuit 21 has no terminal for inputting charging conditions, and the output variable charging circuit 20 has no charging condition memory circuit and no selector switch.

In addition, the charger 29 comprises the above output variable charging circuit 20, a DC power supply 11, and the external signal sources 27 and 28.

In the output variable charging circuit 20 having such a structure, the operational amplification of an external signal output from the external signal source 27 is performed (a signal conversion) by the operational amplification circuit 24 to input the amplified signal to the charging current detection circuit 22. In the charging current detection circuit 22, a charging current detection value as one of the charging characteristic detection values is changed according to the inputted external signal to be inputted to the charging control circuit 21. For example, when the external signal is 1V, the charging current detection value is inputted, as it is, to the charging control circuit 21. When the external signal is 2V, the charging current detection value is decreased to ½ to be input to the charging control circuit 21. Furthermore, when the external signal is 0.5V, the charging current detection value is increased to be twice as much to be input to the charging control circuit 21. In this case, as the value of the external signal continuously changes, the charging current detection value changed and inputted to the charging control circuit 21 also continuously changes. In this way, by changing the charging current detection value to input to the charging control circuit 21, the charging control circuit 21 determines that the charging current is deviating from a predetermined condition, and tries changing the value of the charging current. As a result, for example, in the above case, when the external signal is 2V, the charging control circuit 21 gives control so as to make the charging current twice as much, and when the external signal is 0.5V, the charging control circuit 21 gives control so as to make the charging current ½. In this manner, in the output variable charging unit 20, the value of charging current can be continuously changed according to the external signal inputted to the charging current detection circuit 22.

Meanwhile, similarly, the operational amplification circuit 25 performs the operational amplification (a signal conversion) of an external signal outputted from the external signal source 28 to input the amplified signal to the charging voltage detection circuit 23. In the charging voltage detection circuit 23, as in the case of the charging current, a charging voltage detection value as the other charging characteristic detection value is changed according to an inputted external signal and is inputted to the charging control circuit 21. As described above, by changing the charging voltage detection value to input to the charging control circuit 21, the charging control circuit 21 determines that the charging voltage is deviating from a predetermined condition to change the value of the charging voltage. In this way, in the output variable charging circuit 20, as in the case of charging current detection circuit 23, the value of the charging voltage can be continuously changed according to an external signal inputted to the charging voltage detection circuit 23.

As described above, in the output variable charging circuit 20, the charging characteristics such as the charging current and the charging voltage can be continuously changed according to the inputted external signal. Accordingly, with only the output variable charging circuit 20, whether known or unknown, it is possible to adapt corresponding to any charging characteristic and any combination of secondary batteries by appropriately setting the value of the external signal. In addition, with only the one kind of output variable charging circuit, it is possible to adapt to any kind of secondary battery, with the result that no other kinds of charging circuits are required, thereby leading to cost reduction of the output variable charging circuit by production efficiency.

In addition, since the charger 29 includes the operational amplification circuits 24 and 25 for converting the external signal, it is not always necessary to set the external signal sources 27 and 28 as those most suitable to the charging characteristic detection circuit. Thus, the variation of the external signal sources can be broadened, thereby leading to cost reduction of the charger incorporating the output variable charging circuit 20.

Figure 2:
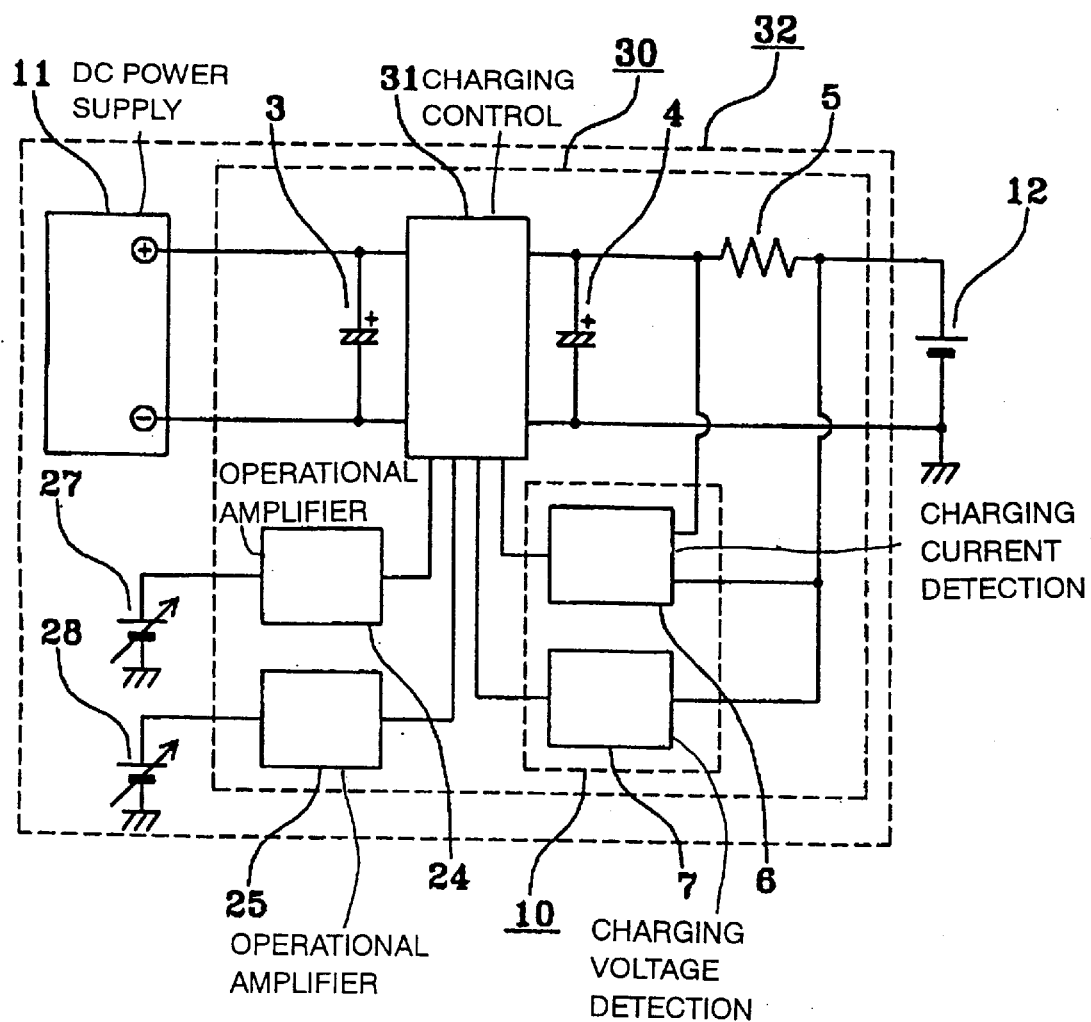
FIG. 2 is a circuit diagram of an output variable charging circuit according to another embodiment of the present invention.

FIG. 2 shows an output variable charging circuit and a charger according to another embodiment of the present invention. In FIG. 2, the same reference numerals are given to the same parts as those shown in FIGS. 1 and 3, and the parts equivalent to those shown in FIGS. 1 and 3. The explanation thereof is omitted.

In FIG. 2, the output variable charging circuit 30 has a charging control circuit 31. The outputs of a charging current detection circuit 6 and a charging voltage detection circuit 7 are connected to the charging control circuit 31. The outputs of operational amplification circuits 24 and 25 are also connected to the charging control circuit 31. The output variable charging circuit 30 includes no charging condition memory circuit and no selector switch, as in the case of the output variable charging circuit 20.

In addition, a charger 32 comprises the above output variable charging circuit 30, a DC power supply 11, external signal sources 27 and 28.

In the output variable charging circuit 30 having such a structure, the operational amplification of an external signal inputted from the external signal source 27 is performed (a signal conversion) by the operational amplification circuit 24, and is inputted to the charging control circuit 31. In the charging control circuit 31, a predetermined charging voltage condition is changed by the external signal to be used as a new charging condition. For example, when the external signal is 1V, the charging current is equivalent to the predetermined condition, and when the external signal is 2V, the charging current is equivalent to ½ of the predetermined condition. Furthermore, when the external signal is 0.5V, the charging current is equivalent to twice as much as that of the predetermined condition. In this situation, the arrangement is set in such a manner that the condition of the changed charging current continuously changes, as the value of the external signal continuously changes. In this way, by changing the predetermined charging condition to set to a value changed by the external signal, the charging control circuit 31 controls the charging current according to the changed charging condition. With this arrangement, in the output variable charging circuit 30, the condition of the charging current can be continuously changed according to the external signal inputted to the charging control circuit 31.

Meanwhile, similarly, the operational amplification circuit 25 performs the operational amplification (a signal conversion) of an external signal outputted from the external signal source 28 to input to the charging control circuit 31. In the charging control circuit 31, the condition of a predetermined charging voltage is changed by an external signal to be used as a new charging condition. In this way, by changing the condition of the predetermined charging voltage to set to a value changed by the external signal, the charging control circuit 31 controls the charging voltage according to the changed charging condition. With this arrangement., in the output variable charging circuit 30, the condition of the charging voltage can be continuously changed according to the external signal inputted to the charging control circuit 31.

As described above, in the output variable charging circuit 30, the charging conditions such as the charging current and the charging voltage can be continuously changed according to the inputted external signal. As a result, with only the output variable charging circuit 30, whether known or unknown, it is possible to adapt to any charging characteristic and any combination of secondary batteries by appropriately setting the value of the external signal. In addition, with only the one kind of output variable charging circuit, it is possible to adapt to any kind of secondary battery, with the result that no other kinds of charging circuits are required, thereby leading to cost reduction of the output variable charging circuit by production efficiency.

In addition, since a charger 32 includes operational amplification circuits 24 and 25 for converting an external signal, it is not always necessary to set the external signal sources 27 and 28 as those most suitable to the charging characteristic detection circuit. Thus, since the variation of the external signal sources can be broadened, cost reduction of the charger 32 incorporating the output variable charging circuit 30 can be achieved.

In each of the above embodiments, although the charging characteristic detection circuit is formed by both the charging current detection circuit and the charging voltage detection circuit, only one of the two circuits may be used as the charging characteristic detection circuit.

Furthermore, in each of the above embodiments, in order to convert the external signal outputted from the external signal sources 27 and 28 into a signal most suitable to the charging current detection circuit 22, the charging voltage detection circuit 23, and the charging control circuit 31, the operational amplification circuits 24 and 25 are disposed as signal conversion circuits. However, the signal conversion circuits are not limited to operational amplification circuits, and other kinds of signal conversion circuits may be used. In addition, as long as the external signal sources 27 and 28 can output signals most suitable to the charging current detection circuit 22, the charging voltage detection circuit 23, and the charging control circuit 31, the arrangement can be applied even if no signal conversion circuit such as an operational amplification circuit is provided.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An output variable charging circuit comprising:

a charging control circuit for controlling charging characteristics so as to satisfy a predetermined charging condition; and a charging characteristic detection circuit connected to the charging control circuit, the charging characteristic detection circuit detecting at least one charging characteristic to obtain a charging characteristic detection value, and changing the charging characteristic detection value according to at least one input external signal so as to feedback to the charging control circuit.

2. The output variable charging circuit of claim 1, wherein the charging characteristic detection circuit comprises at least one of a charging current detection circuit and a charging voltage detection circuit and the at least one charging characteristic is determined by the at least one input external signal.

3. The output variable charging circuit of claim 1, wherein the charging characteristic detection circuit has at least one output coupled to the charging control circuit.

4. The output variable charging circuit of claim 1, wherein the at least one input external signal is coupled to the charging characteristic detection circuit.

5. The output variable charging circuit of claim 1, wherein the at least one input external signal is coupled to the charging control circuit.

6. The output variable charging circuit comprising:

a charging control circuit for controlling charging characteristics such that a predetermined charging condition is changed by at least one input external signal and a changed charging condition is thereby satisfied; and a charging characteristic detection circuit connected to the charging control circuit, the charging characteristic detection circuit detecting at least one charging characteristic to obtain a charging characteristic detection value so as to feedback the charging characteristic detection value to the charging control circuit.

7. The output variable charging circuit of claim 6, wherein the charging characteristic detection circuit comprises at least one of a charging current detection circuit and a charging voltage detection circuit and the at least one charging characteristic is determined by the at least one input external signal.

8. The output variable charging circuit of claim 6, wherein the charging characteristic detection circuit has at least one output coupled to the charging control circuit.

9. The output variable charging circuit of claim 6, wherein the at least one input external signal is coupled to the charging characteristic detection circuit.

10. The output variable charging circuit of claim 6, wherein the at least one input external signal is coupled to the charging control circuit.

11. The output variable charging circuit of claim 1 further comprising a signal conversion circuit for converting the at least one external signal into a converted signal.

12. The output variable charging circuit of claim 6, further comprising a signal conversion circuit for converting the at least one external signal into a converted signal.

13. A charger comprising an output variable charging circuit comprising:

a charging control circuit for controlling charging characteristics so as to satisfy a predetermined charging condition; and a charging characteristic detection circuit connected to the charging control circuit, the charging characteristic detection circuit detecting at least one charging characteristic to obtain a charging characteristic detection value, and changing the charging characteristic detection value according to at least one input external signal so as to feedback to the charging control circuit; and further comprising a DC power supply for supplying a DC current to the output variable charging circuit, and an external signal source for inputting the at least one input external signal to the output variable charging circuit.

14. A charger comprising an output variable charging circuit comprising:

a charging control circuit for controlling charging characteristics such that a predetermined charging condition is changed by at least one input external signal and a changed charging condition is thereby satisfied; and a charging characteristic detection circuit connected to the charging control circuit, the charging characteristic detection circuit detecting at least one charging characteristic to obtain a charging characteristic detection value so as to feedback the charging characteristic detection value to the charging control circuit, further comprising:

a DC power supply for supplying a DC current to the output variable charging circuit, and an external signal source for inputting the at least one input external signal to the output variable charging circuit.

* * * * *